March 17, 1959     G. PLOGER     2,877,667
REVERSIBLE AND CONTINUOUSLY VARIABLE TORQUE CONVERTER
Filed Feb. 17, 1958     2 Sheets-Sheet 1

INVENTOR.

March 17, 1959 G. PLOGER 2,877,667
REVERSIBLE AND CONTINUOUSLY VARIABLE TORQUE CONVERTER
Filed Feb. 17, 1958 2 Sheets-Sheet 2

INVENTOR.

United States Patent Office 2,877,667
Patented Mar. 17, 1959

2,877,667

REVERSIBLE AND CONTINUOUSLY VARIABLE TORQUE CONVERTER

Gustav Ploger, Baltimore, Md.

Application February 17, 1958, Serial No. 715,662

3 Claims. (Cl. 74—751)

This invention uses gyroscopic forces for power transmission. The main problem in the design of such transmissions lies in the fact, that a flywheel changes the direction of its gyroscopic torque (due to precession) when its spin axis is tilted about 180 degrees. Thus, no unidirectional torque can be obtained without special means or special gear arrangements.

Several inventions providing means and gear arrangements to make the output torque unidirectional have been patented. The proposed means and arrangements, however, are partly rather complex, and some of the inventions have devices somewhat unusual in engineering design. Furthermore, most inventions do not show means by which for a given output power requirement torque and speed the corresponding values at the input side can be chosen arbitrarily. Finally, most of the patented inventions do not provide for change of torque direction at the output side without shifting gears or changing elements.

This invention intends to provide a mechanism which
(1) Uses common mechanical parts to obtain unidirectional output torque,
(2) Can be adjusted, by means of a simple control device, to arbitrary values of torque and speed at the input side in a wide range,
(3) Has reversible torque direction at the output side including a position of idling motion,
(4) Has many applications including control and stabilization of space vehicles.

The unidirectional torque is obtained by using a so-called "spinning device" which has a periodically variable moment of inertia with respect to its spin axis. The properties under (2), (3) and (4) are achieved by shifting the starting point of the period. The starting point can be shifted continuously.

Figure 1:
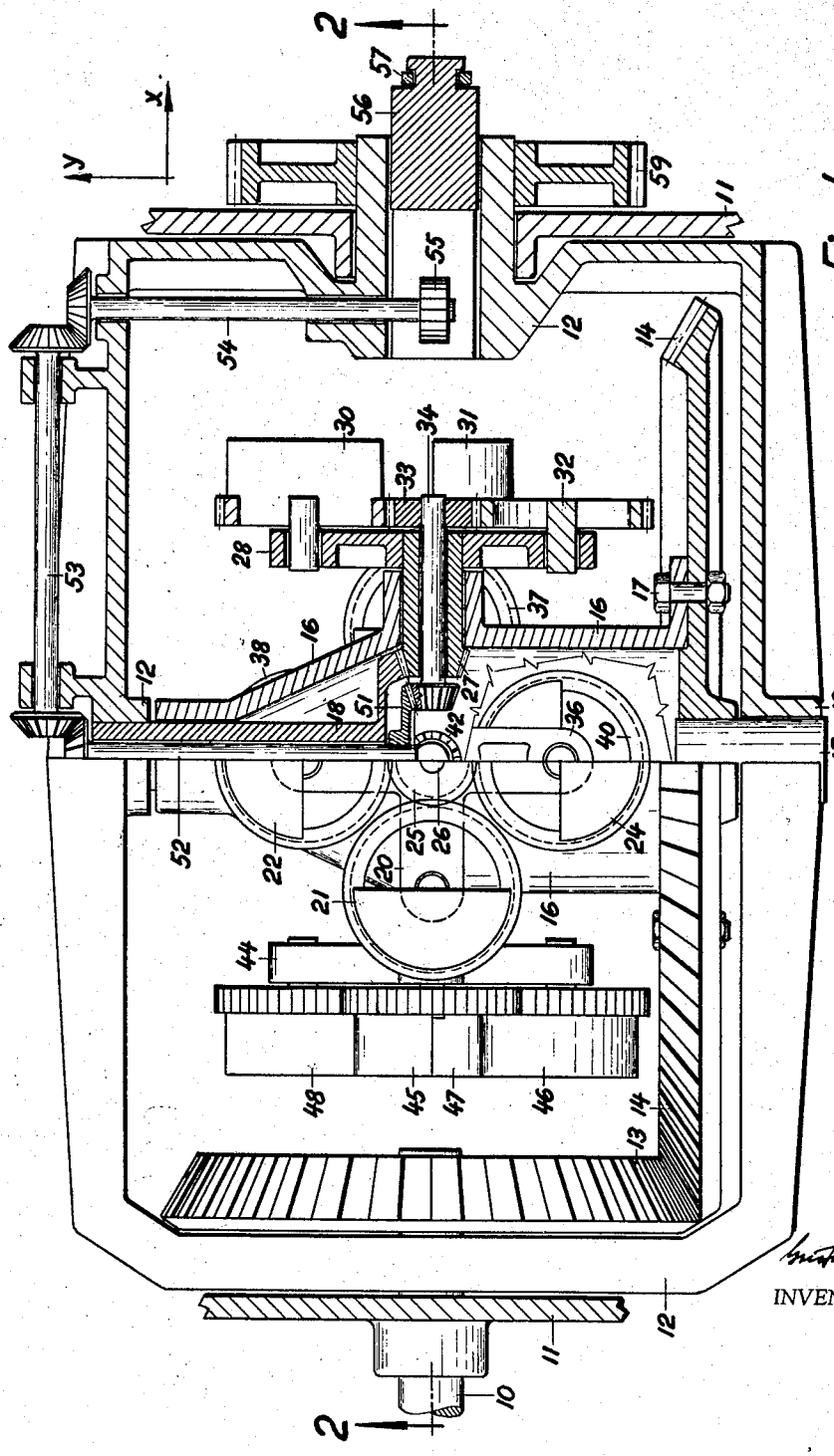
Figure 2:
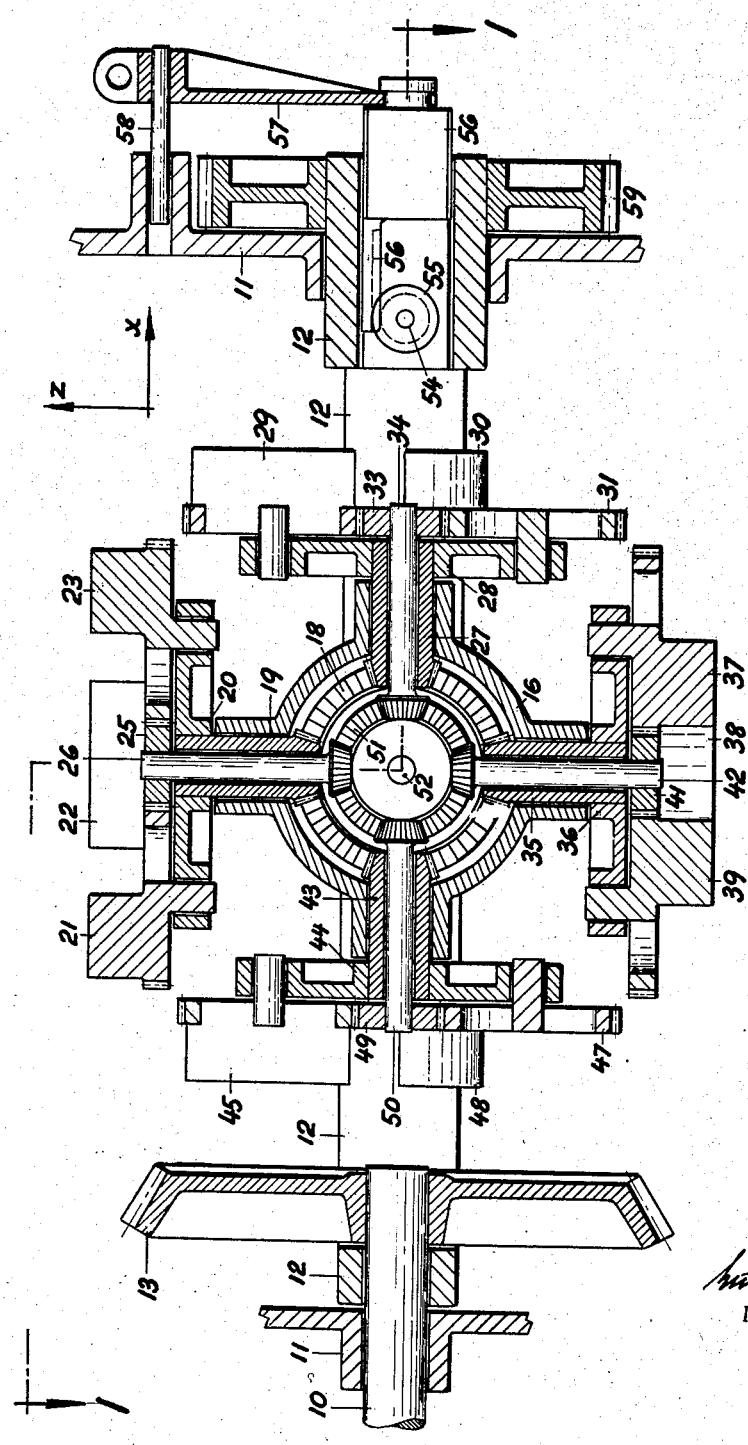

The basic ideas of the invention will be understood by looking at the figures and by the following description:
Fig. 1 is a part-sectional view according to line 1—1 in Fig. 2. Fig. 2 is a sectional side elevation along line 2—2 in Fig. 1. All simple and evident mechanical means as bushings, anti-friction bearings, elements to key gears to shafts, collars and shoulders to prevent pivots from moving axially, etc. have been omitted for clarity. Each figure shows a coordinate system. The coordinates are referred to in the description. The shown directions of coordinates are taken as positive.

The driving shaft 10 can rotate in a bearing of the stationary housing 11 and in a bearing of the movable frame 12 and is keyed to the beveled gear 13. At the opposite side, the frame 12 can rotate in another bearing of the housing 11. The frame 12 has for this purpose a short hollow shaft (the purpose of the hole in the shaft will be explained below) to which the driven gear 59 is keyed. The driven gear 59 is an alignment with the driving shaft 10. The axis of the driving shaft 10 and of the driven gear 59 will be referred to further on as power axis.

The bevel gear 13 is meshing with the bevel gear 14 which is keyed to the shaft 15. The shaft 15 is perpendicular to the driving shaft 10 and can rotate in another bearing of the frame 12. In alignment with the shaft 15 are: (a) the cylindrical and, at one end, conical cage 16 attached by bolts, as e. g. bolt 17, to the bevel gear 14; (b) the hollow shaft 18 keyed to the frame 12 at the opposite side of the bearing of shaft 15. The cylindrical and conical cage 16 has a bearing at the top of the cone and is, with this bearing, fulcrumed to the hollow shaft 18. Thus, the bevel gear 14, the shaft 15 and the cylindrical and conical cage 16 can rotate around an axis which is perpendicular to the axis of the driving shaft 10 and which will be referred to further on as precession axis.

The cylindrical and conical cage 16 has four bearings radially arranged and equally spaced around the precession axis (see Fig. 2). The hollow shafts with beveled pinions 19, 27, 35, 43 can rotate in these bearings and are meshing altogether with a bevel gear integral with the hollow shaft 18. Furthermore, the hollow shafts of the beveled pinions 19, 27, 35, 43 are keyed to the cross-like supports 20, 28, 36, 44 respectively. Each of these cross-like supports has at each end of its four legs a bearing in which an eccentric element is journaled. Thus, to the cross-like support 20 belong the eccentric elements 21, 22, 23, 24, to the cross-like support 28 belong the eccentric elements 29, 30, 31, 32, to the cross-like support 36 belong the eccentric elements 37, 38, 39, 40, and to the cross-like support 44 belong the eccentric elements 45, 46, 47, 48. All eccentric elements are equal. Each of them consists of three essential parts: (a) a pivot which can rotate in a bearing of the corresponding cross-like support; (b) a gear ring co-axial to the pivot; (c) an eccentric mass with its centroid outside of the pivot axis. The eccentric elements are arranged, with respect to their corresponding cross-like support, in such a manner, that the centroids of all eccentric masses have the same distance from the axis of their corresponding cross-like support, or, with other words: the eccentric elements are arranged symmetrically around the axes of their corresponding cross-like supports. The symmetry axes are identical with the axes of the hollow shafts 19, 27, 35, 43 and will be referred to further on as spin axes.

In the shown embodiment of the invention the eccentric masses are semi-cylindrical bodies integral with and co-axial to the pivots and gear rings. It is not essential, however, for the invention that these parts be integral with each other. Production requirements may call for other designs. Essential for the invention is that each eccentric element have a gear, a pivot or shaft co-axial to the gear and an eccentric mass. The eccentricities (distances of mass centroids from the gear ring axes) and the weights of all eccentric elements should be equal in order to avoid vibrations.

The gear rings of the four eccentric elements belonging to one same cross-like support are altogether meshing with a central gear which is co-axial to the spin axis. Thus, the eccentric elements 21, 22, 23, 24 are meshing with the central gear 25, the eccentric elements 29, 30, 31, 32 are meshing with the central gear 33, the eccentric elements 37, 38, 39, 40 are meshing with the central gear 41, and the eccentric elements 45, 46, 47, 48 are meshing with the central gear 49. The central gears 25, 33, 41, 49 are keyed to the shafts of the beveled pinions 26, 34, 42, 50 respectively which can rotate in the hollow shafts of the beveled pinions 19, 27, 35, 43 respectively. The beveled pinions of the shafts 26, 34, 42, 50 are meshing altogether with the beveled gear 51 keyed to the shaft 52 which can rotate in the hollow shaft 18. The set of elements which is composed of one cross-like support, of the four eccentric elements belonging to it and of the central gear meshing with the gear rings of the four eccentric elements will be referred to further on as "spinning device."

The shaft 52 has, at the end opposite to the beveled gear 51, a beveled pinion to which motion can be transmitted by means of a train of other beveled pinions belonging to the shafts 53, 54. The shaft 53 is parallel to the power axis and can rotate in two bearings integral with the frame 12. The shaft 54, perpendicular to the shaft 53, can also rotate in two bearings integral with the frame 12 and is, at one end, keyed to the gear 55. The gear 55 is meshing with the gear rack 56 integral with a prismatic body with preferably quadratic cross-section, the axis of which is in alignment with the power axis. The prismatic body integral with the gear rack 56 can be moved axially in a hole of the frame 12, this hole having a shape which fits together with the prismatic body 56. The prismatic body has, at the end opposite to the gear rack, a groove in which a fork of the lever 57 can slide. The lever 57 is keyed to the shaft 58 which can slide in a hole of the housing 11 in direction of the power axis. The purpose of the elements described in this paragraph is the following: Starting from a point of the stationary housing 11, a motion can be transmitted, by means of the shaft 58, the lever 57, the prismatic body integral with the gear rack 56, the gear 55, the shafts 54, 53 and 52 with their corresponding beveled pinions, to the beveled gear 51 keyed to the shaft 52. Therewith, the motion is transmitted to the shafts with beveled pinions 26, 34, 42, 50 keyed to the gears 25, 33, 41, 49 respectively and therewith to all eccentric elements. Thus, the positions of all eccentric elements relative to their corresponding cross-like supports can be changed by moving the lever 57. This changing of positions of the eccentric elements signifies shifting of the starting point of a period which exists in the motion of the eccentric elements relative to their corresponding cross-like supports. The period or periodicity in the motion of the eccentric elements is achieved by proper gear ratios. The gear ratio of the beveled gear integral with shaft 18 to the hollow shafts and beveled pinions 19, 27, 35, 43, the gear ratio of the beveled gear 51 to the beveled pinions and shafts 26, 34, 42, 50 and the gear ratio of the central gears 25, 33, 41, 49 to the gear rings of the eccentric elements are such, that a periodical motion of the eccentric elements relative to their corresponding cross-like supports of the following kind takes place: Each time when the spinning devices make a full turn (360 degrees) around the precession axis, all eccentric elements make a full turn, too, relative to their corresponding cross-like supports. Thus, a periodicity develops in the positions of the mass centroids of the eccentric elements with respect to their corresponding spin axes. With other words: the moments of inertia of the spinning devices with respect to their spin axes vary periodically between a maximum and a minimum value. The period is $2\pi$ in terms of angle of rotation of the spinning devices around the precession axis. The starting point of the period can be shifted continuously by moving the lever 57. The eccentric elements in the different spinning devices are so arranged that the spinning devices passing through a determinate angular position in the plane of rotation around the precession axis have the same moment of inertia. In the positions of spinning devices shown in the figures the moment of inertia of the spinning device belonging to the cross-like support 20 is a maximum, and that belonging to the cross-like support 36 is a minimum. The moments of inertia of the remaining two spinning devices belonging to the cross-like supports 28 and 44 are equal and have an intermediate value between the extreme values.

*Mode of operation of the torque converter as drive*

When the driving shaft 10 is rotated and the driven gear 59 restrained by a torque load, the spinning devices rotate, by means of the described gear trains, around their spin axes and, at the same time, are tilted around the precession axis. Thereby, according to well-known rules of mechanics, gyroscopic forces develop in the mass elements of the spinning devices. These forces yield torque components around the power axis. They are transmitted by the cylindrical and conical cage 16 to the frame 12 and, therefore, to the driven gear 59. The torque components are proportional to the moments of inertia of the spinning devices. The torque components of the spinning devices belonging to the cross-like supports 20 and 36, in the positions shown in the figures, are acting opposite to each other, but the difference between their moments of inertia yields a net torque around the power axis. Looking in direction of the $x$-axis, this net torque acts counter-clockwise when the driven shaft is rotated clockwise. The torque components of the spinning devices belonging to the cross-like supports 28 and 44, in the positions shown in the figures, are acting opposite to each other but are equal and, therefore, cancel each other. The driven gear 59 will begin to rotate when the output torque developed by the mechanism overcomes the torque load at the driven gear. Equilibrium will be reached when input power is equal to output power. For a given output requirement represented by the two values torque and speed the corresponding values at the input side are determined by the two rules of mechanics: (a) Equilibrium of forces acting upon each element involved in the power transmission must be established; (b) Input power must be equal to output power. Thus, input torque and input speed could not be chosen arbitrarily, if there would not be an arbitrarily variable element in the mechanism. The spinning device described in this invention is such an arbitrarily variable element.

It has been shown how the periodically variable moments of inertia of the spinning devices develop a unidirectional torque at the output side. If, by means of the described control device, the starting point of the period were shifted that way, that the moments of inertia of the spinning devices belonging to the cross-like supports 20 and 36 would be equal in the positions shown in the figures, then no torque would be transmitted to the driven gear 59, because the torque components would act opposite and would be equal and, therefore, would cancel each other. The remaining two spinning devices would yield a net torque around the $z$-axis which would be reacted in the bearings of the housing 11. This would be the idling position of the elements involved in the power transmission. Starting from this idling position and shifting the starting point of the period which governs the motion of the eccentric elements, to either side about $+\pi/2$ and $-\pi/2$, the maximum torque at the driven gear, acting counter-clockwise and clockwise respectively, can be obtained. Between these extreme values a continuity of values can be chosen.

*Mode of operation of the torque converter as control device and stabilizer*

The described mechanism could be installed in a space vehicle. Rotating the input shaft by any available power source and locking the output gear or shaft to the body of the space vehicle, the developed torque components would be transmitted to the body. The following operations could be accomplished:

(1) If the eccentric elements were in the positions shown in the figures, a clockwise input torque, locking in $x$-axis direction, would yield a counterclockwise output torque which could be reversed by shifting the starting point of the period about $\pi$.

(2) If the period would be shifted about $+\pi/2$ or $-\pi/2$, the extreme values of torque around the $z$-axis in either direction would be obtained.

(3) If the period were shifted as under (2) and the driven shaft were turned about 90 degrees around its own axis, the extreme values of torque around the $y$-axis would be obtained.

Thus, a space vehicle can be turned around three mutually perpendicular axes without applying exterior forces.

If it were desired to prevent a space vehicle from turning around any of its axes by exterior forces (gravitation, air drag etc.) then the mechanism could, in connection with proper control devices, develop counteractions.

Thus, the space vehicle can be stabilized.

It can be proved mathematically, that three or more spinning devices are necessary for unidirectional output torque. Furthermore, each spinning device should have three or more eccentric elements to prevent the mechanism from vibration. Production requirements call for the least possible number of parts. So, an embodiment with three spinning devices each of them having three eccentric elements would be the preferred one. The shown embodiment facilitates description and was chosen for this reason. It must be pointed out, however, that rather the basic principles for the invention are important than a specific embodiment.

I claim:

1. In a torque converter using gyroscopic forces for power transmission and having a power axis in alignment with input and output member, a precession axis perpendicular to the power axis and several spin axes perpendicular to the precession axis, several spinning devices each of them rotatable around one of said spin axes, each of said spinning devices comprising three or more eccentric elements each of them composed of a gear ring, a pivot or shaft co-axial with said gear ring, and an eccentric mass with its centroid outside of the axis of said gear ring, said pivots or shafts of said eccentric elements journaled in bearings of a suitable structure forming a part of the spinning device, the axes of said bearings at equal distances from the spin axis and parallel to it, said eccentric elements so arranged in said bearings that all centroids of said eccentric masses have the same distance from the spin axis, said gear rings of the eccentric elements operatively connected, by means of a central gear co-axial with the spin axis and meshing with all gear rings, said spinning devices operatively connected, by means of a first set of beveled gears, to a first, hollow, shaft co-axial with the precession axis and keyed to a structure rotatable simultaneously with the output member, the central gears of said spinning devices operatively connected, by means of a second set of beveled gears, to a second shaft co-axial with said first, hollow, shaft, the ratio of said first set of beveled gears, the ratio of said second set of beveled gears and the ratio of said central gears meshing with said gear rings so chosen, that a relative motion of the centroids of said eccentric masses with respect to the spin axis of the corresponding spinning device takes place, whereby the moment of inertia of the spinning device is varied.

2. In a torque converter using gyroscopic forces for power transmission and having a power axis in alignment with input and output member, a precession axis perpendicular to the power axis and three or more spinning devices with their spin axes perpendicular to and equally spaced around the precession axis, said spinning devices mounted in bearings of a suitable structure operatively connected, by means of a beveled gear, to the power input member for rotation around the precession axis, said suitable structure capable of torque transmission to the power output member, said spinning devices having each three or more eccentric elements rotatable in bearings located symmetrically around the spin axis and with their axes parallel to the spin axis, said spinning devices operatively connected, by means of a first set of beveled gears, to a first, hollow, shaft co-axial with the precession axis and keyed to a structure rotatable simultaneously with the power output member, said eccentric elements of each spinning device operatively connected, by means of central gears meshing with the eccentric elements and a second set of beveled gears, to a second shaft co-axial with said first, hollow, shaft, the gear ratios of said first set of beveled gears, of said second set of beveled gears and of said central gears so chosen, that the eccentric elements make a full turn relative to their bearings during each full turn of the spinning devices around the precession axis, furthermore, the meshings of said first set of beveled gears and of said second set of beveled gears so arranged that each spinning device has a particular moment of inertia corresponding to its angular position in the plane of rotation around the precession axis and that the moment of inertia of each spinning device has the same value when passing through the same angular position.

3. In a torque converter using gyroscopic forces for power transmission and having a power axis in alignment with power input and output member, a precession axis perpendicular to the power axis and three or more spinning devices with their spin axes perpendicular to and equally spaced around the precession axis, said spinning devices comprising each, for periodical variation of their moments of inertia, three or more eccentric elements rotatable like planet wheels around a sun wheel or central gear co-axial with the spin axis, the central gears of all spinning devices operatively connected, by means of shafts and beveled pinions, to a shaft co-axial with the precession axis, said shaft co-axial with the precession axis operatively connected, by means of a train of gears and other shafts, to a member sliding co-axially with the power axis and being movable by a control member in a stationary housing, therewith, by moving said control member changing the positions of said eccentric elements within their corresponding spinning devices and, the whole mechanism being in motion, changing the starting points of the periods provided for the moments of inertia of said spinning devices.

References Cited in the file of this patent

UNITED STATES PATENTS

| | | |
|---|---|---|
| 1,544,834 | Gooder | July 7, 1925 |
| 1,914,865 | Rath | June 20, 1933 |
| 2,639,631 | Taylor | May 26, 1953 |